United States Patent
Yamauchi et al.

(10) Patent No.: US 8,495,668 B2
(45) Date of Patent: Jul. 23, 2013

(54) SPINDLE MOTOR ATTACHMENT STRUCTURE FOR A DISC DRIVE APPARATUS

(75) Inventors: Yoshiaki Yamauchi, Omitama (JP); Takayuki Fujimoto, Tsuchiura (JP); Shinya Tsubota, Mito (JP); Makoto Ibe, Hitachinaka (JP); Nozomu Harada, Kawasaki (JP); Seiji Hamaie, Kawasaki (JP); Shinya Asano, Tokyo (JP)

(73) Assignees: Hitachi Consumer Electronics Co., Ltd., Tokyo (JP); Hitachi-LG Data Storage, Inc., Tokyo (JP)

( * ) Notice: Subject to any disclaimer, the term of this patent is extended or adjusted under 35 U.S.C. 154(b) by 822 days.

(21) Appl. No.: 12/540,431

(22) Filed: Aug. 13, 2009

(65) Prior Publication Data

US 2010/0053806 A1   Mar. 4, 2010

(30) Foreign Application Priority Data

Aug. 29, 2008   (JP) ................................ 2008-220677

(51) Int. Cl.
*G11B 17/03* (2006.01)
(52) U.S. Cl.
USPC .......................................................... 720/697
(58) Field of Classification Search
USPC ................. 360/98.07, 99.04, 99.08–99.11; 720/695–700
See application file for complete search history.

(56) References Cited

U.S. PATENT DOCUMENTS

| 5,796,696 A | * | 8/1998 | Shigenai et al. | ............... | 720/677 |
| 6,400,674 B1 | * | 6/2002 | Maeda | ........................... | 720/684 |
| 2003/0112734 A1 | * | 6/2003 | Shishido et al. | ............... | 369/263 |

FOREIGN PATENT DOCUMENTS

| JP | 2000-298929 | 10/2000 |
| JP | 2007-280452 | 10/2007 |
| JP | 2008-123628 | 5/2008 |
| JP | 2008-276866 | 11/2008 |

* cited by examiner

*Primary Examiner* — Nathan Danielsen
(74) *Attorney, Agent, or Firm* — Antonelli, Terry, Stout & Kraus, LLP.

(57) ABSTRACT

A disc drive apparatus comprises: a spindle motor 20 for hold a disc 2 and for rotate it; an optical head 7 for conducting either one of recording or reproducing of information onto/from the disc; a driver unit for moving the optical head in a radial direction of the disc; and a unit mechanism chassis 8 for supporting those thereon, fixedly, wherein the spindle motor is constructed with a rotational drive means made of a magnetic circuit, a rotor portion and a rotation shaft, which define a rotation body, and a spindle motor attachment plate to hold those thereon, and the spindle motor attachment plate has a semi-circular shaped plate configuration in a part thereof, nearly fitting to an outer diameter the rotor portion, in a direction where the optical head is provided, and has a step-like structure in thickness direction of the plate thereof, within a semi-circular shaped region with respect to a line connecting between corner portions on both ends of that semi-circular shape, and also bridging over that line.

3 Claims, 7 Drawing Sheets

OPTICAL HEAD SIDE

OPTICAL HEAD SIDE

IMPACT POWER

SPINDLE MOTOR ATTACHMENT STRUCTURE FOR A DISC DRIVE APPARATUS

BACKGROUND OF THE INVENTION

The present invention relates to a disc drive apparatus, which is used in a mobile PC or the like, for example, and it relates, in particular, to the disc drive apparatus, upon which high shock-resistant performance is required.

The disc drive apparatus, which is mounted on the mobile PC, is required to be thin in thickness of the apparatus and to be light in weight thereof, therefore thin-sizing/light-weighting is/are essential for parts building up the apparatus. For this reason, each part is in a tendency of decreasing the rigidity thereof. On the other hand, high shock-resistant performance is required for the disc drive apparatus, and then it is necessary to ensure or keep a high reliability, in performances of recording/reproducing, even after being applied with an impact or shock thereon.

As one of factors of deteriorating the recording/reproducing performances, there is a relative tilting between an optical head and a disc. This is dominant, what is caused due to plastic deformation, being produced in the structural part by the impact or shock. In particular, a spindle motor, on which the disc is mounted within the apparatus, is attached on a unit mechanism chassis, forming an inner housing, at three (3) places of fixing positions, which are provided on a spindle motor attachment plate. Accordingly, because of the positional relationship between a supporting point, as a fixed portion, and a gravity center point of the spindle motor, a moment power acts at the position of the gravity center of the motor when the impact is applied, and deformation is generated in the spindle motor attachment plate, and therefore the disc mounted thereon inclines together with the spindle motor.

For dealing with such problem mentioned above, it is necessary to provide the structures for obtaining an increase of the rigidity against bending (i.e., a flexural rigidity), thereby reducing the deformation of the spindle motor attachment plate when the impact is applied.

In the following Patent Document 1 is disclosed the structure for preventing from the deformation, i.e., increasing the rigidity of a motor attachment portion, with providing a ring-like lib surrounding that motor attachment portion, upon a base for holding a motor that rotationally drives the disc thereon.

[Patent Document] Japanese Patent Laying-Open No. 2000-298929.

BRIEF SUMMARY OF THE INVENTION

Within the technology described in the Patent Document 1, the structure of providing the ring-like lib surrounding the motor attachment portion, on that base for supporting the motor thereon, is disposed below a lower surface of the disc mounted on the motor, and therefore this is difficult to be applied, in the structures thereof, into a disc drive apparatus comprising an optical head having a traveling means, so that it can move from an inner periphery to an outer periphery in a radial direction of the disc, and at least, in a region where that optical head travels in the direction of the optical head, it is necessary to provide a cutoff portion in part of the base.

Also, if that base is formed together with the housing structure in one body, it is impossible to make an initial adjustment of an amount of relative tilting between the optical head and the disc, on side of the motor, in a process of assembling the apparatus, and it is also difficult to deal with, such as, selection of an inferior good caused due to the motor, for example. Accordingly, other than the problem of assembling the apparatus, there is caused a problem that cost of the apparatus increases.

An object is, according to the present invention, to provide a disc drive apparatus having a high reliability, suppressing the deterioration of the recording/reproducing performances of the disc drive apparatus due to an application of impact thereon, by preventing the spindle motor portion from being deformed.

The object mentioned above, according to the present invention, is accomplished by a disc drive apparatus, comprising: a spindle motor, which is configured to hold a disc and to rotate it; an optical head, which is configured to conduct either one of recording or reproducing of information onto/from the disc; a driver unit, which is configured to move said optical head in a radial direction of the disc; and a unit mechanism chassis, which is configured to support those thereon, fixedly, wherein said spindle motor is constructed with a rotational drive means made of a magnetic circuit, a rotor portion and a rotation shaft, which define a rotation body, and a spindle motor attachment plate to hold those thereon, and said spindle motor attachment plate has a semi-circular shaped plate configuration in a part thereof, nearly fitting to an outer diameter the rotor portion, in a direction where said optical head is provided, and has a step-like structure in thickness direction of the plate thereof, within a semi-circular shaped region with respect to a line connecting between corner portions on both ends of that semi-circular shape, and also bridging over that line.

Also, the object mentioned above, according to the present invention, is accomplished by the disc drive apparatus, as described in the above, wherein said spindle motor attachment plate, having the semi-circular shaped plate portion fitting to the outer diameter of the rotor of said spindle motor, has a step-like structure in thickness direction of the plate thereof, in a region including corner portions of said semi-circular shape.

Also, the object mentioned above, according to the present invention, is accomplished by the disc drive apparatus, as described in the above, wherein said spindle motor attachment plate, having the semi-circular shaped plate portion fitting to the outer diameter of the rotor of said spindle motor, is fixedly supported onto said unit mechanism chassis by fixedly supporting portions locating at least two (2) or more positions, and has the step-like structures in the direction of said spindle motor attachment plate, within a region bridging over a line connecting between the two (2) positions of those fixedly supporting portions, near to said optical head, in a radial direction of the disc, into which said optical head can move.

According to the invention mentioned above, it is possible to provide a disc drive apparatus having a high reliability, suppressing the deterioration of the recording/reproducing performances of the disc drive apparatus due to an application of impact thereon, by preventing the spindle motor portion from being deformed.

BRIEF DESCRIPTION OF THE SEVERAL VIEWS OF THE DRAWING

Those and other objects, features and advantages of the present invention will become more readily apparent from the following detailed description when taken in conjunction with the accompanying drawings wherein.

DETAILED DESCRIPTION OF THE PREFERRED EMBODIMENTS

Figure 1:
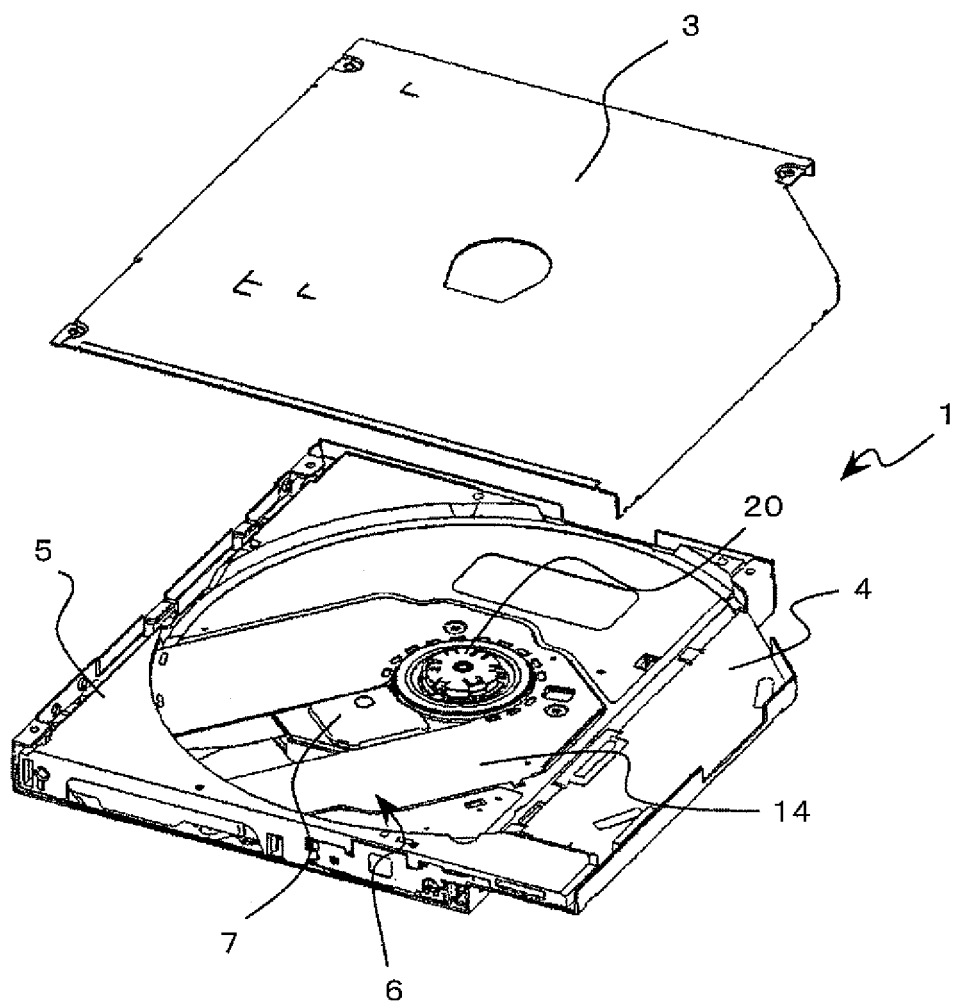
FIG. 1 is a view for showing the outlook structures of a disc drive apparatus, according to an embodiment of the present invention.

Hereinafter, embodiments according to the present invention will be fully explained by referring to the attached drawings.

Embodiment 1

Explanation will be made on an embodiment of implementing the disc drive apparatus of the present invention, by referring to the drawings attached herewith. FIGS. 1 to 7 are views for explaining the embodiment of the present invention, wherein elements attached with the same reference numerals in those figures indicate the same ones, and the basic structures and operations thereof are same to those of them.

First of all, explanation will be given to the structures of the disc drive apparatus 1, according to one embodiment of the present invention.

FIG. 1 is a perspective view of exploded disc drive apparatus, according to the present embodiment.

In FIG. 1, the disc drive apparatus 1 is that for conducting recording/reproducing of information onto/from a recording medium, such as, CD, DVD, BD (Blu-ray disc) or HD-DVD, etc., each having a diameter of 120 mm and thickness of 1.2 mm (hereinafter, being called "a disc 2"), i.e., being the disc drive apparatus 1, so-called of "slim type (or, super-slim type) drive", having sizes of the apparatus: about 130 mm in width, 130 mm in depth, and 12.7 mm (or, 9.5 mm) in thickness, e.g., in a shape of thin-box, to be installed within a mobile-type personal computer.

The disc drive apparatus 1 is made up with a housing, being formed with a top cover 3 and a bottom cover 4, which are assembled through fitting or fastening by screws. The top cover 3 and the bottom cover 4 are manufactured through press-forming of a thin steel plate. Within the housing (i.e., within the disc drive apparatus) is disposed a disc tray 5, as a molding of a resin. On a front edge of the disc tray 5 is attached a front panel not shown in the figure.

On a lower surface of the disc tray 5 is mounted a unit mechanism 6. The unit mechanism 6 is attached to the disc tray 5 through a plural number of insulators 9, each being made of an elastic body. With an aid of those insulators 9, vibration and/or impact (shock) is/are damped or attenuated, which is/are transmitted from an outside of the apparatus to the unit mechanism 6, or which is/are transmitted from the unit mechanism 6 to the outside.

The unit mechanism 6 has a unit mechanism chassis 8 not shown in the figure, as a base thereof, and on this unit mechanism chassis 8 are mounted a spindle motor 20 for rotationally driving the disc 2, a turntable for supporting the disc 2 thereon, an optical head 7 for reproducing the information recorded on a recording surface of the disc 2, or recoding information on the recording surface thereof, a driver means for moving the optical head 7 along a radius of the disc, and a unit cover 14 for protecting those parts from touching and/or electrical noises.

At a center of the disc tray 5 is formed a circular groove, which is larger a little bit in diameter than the disc 2. A part of the bottom surface of this circular groove is cut off, so that the unit cover 14 of the unit mechanism 6, the optical head 7 and the spindle motor 20 are exposed therethrough. With that cutoff portion of the disc tray 5, it is possible to maintain a space between the disc 2 and the optical head 7 mounted on the unit mechanism 6.

According to the present invention, in such the disc drive apparatus 1 as mentioned above, for the purpose of preventing one of the structural parts inside the apparatus, such as, the attachment plate 21 of the spindle motor 20, from being deformed, when being applied an external force, i.e., the impact or shock thereon, there is provided an anti-bending reinforcement structure, for reducing the bending stress generated on that attachment plate 21 of the spindle motor 20, thereby dispersion thereof.

Hereinafter, explanation will be made on the embodiment for implementing the present invention, i.e., the disc drive apparatus 1, by referring to the drawings attached herewith.

Figure 2:
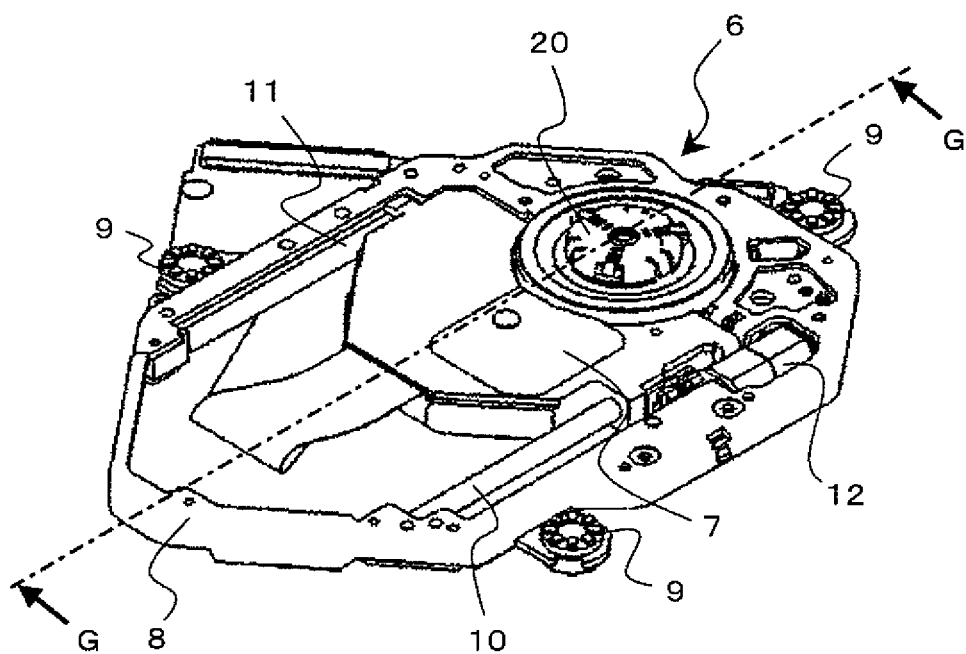
FIG. 2 is a view for showing the structures of a unit mechanism portion, in general, of the disc drive mechanism.

FIG. 2 is a view for showing the outlook structures of the unit mechanism 6 of the disc drive apparatus 1.

In FIG. 2, for the purpose of explaining the structures of the unit mechanism 6, it is shown in the condition of removing the unit cover 14, which is attached on the unit mechanism 6, therefrom. The unit mechanism chassis 8, as the base of the unit mechanism 6, is a frame structure, which is formed through press working of a steel plate. Thus, the unit mechanism chassis 8 has the structure of increasing the rigidity thereof against bending (i.e., the flexural rigidity), by bending almost of the outer periphery thereof downwards.

On that mechanism chassis 8 are fixed the spindle motor 20 for rotationally driving the disc 2 mounted thereon, through the attachment plate 21 of the spindle motor 20, with the fitting or fastening by screws. Also, the optical head 7, for conducting the recording of information or the reproducing of information from/onto the disc 2 mounted on the spindle motor 20, is supported through a moving means, which can move in the radial direction of that disc 2.

The optical head 7 is supported by bearing portions, which are provided on both sides thereof, to be able to slide in the radial direction of the disc 2, through a main guide bar 10 and a sub-guide bar 11. As a force for driving the optical head 7 into the radial direction of the disc 2, a rotation power of a step motor, which is provided on the unit mechanism 6, is transmitted to that optical head 7, after being converted into driving power in a linear direction, i.e., in the traveling direction of the optical head 7, through gears not shown in the figure. The unit mechanism 6 is elastically supported on the disc tray 5, which was explained in the above, through three (3) pieces of the insulators 9, which are provided on the outer periphery of the unit mechanism chassis 8.

Figure 3A:
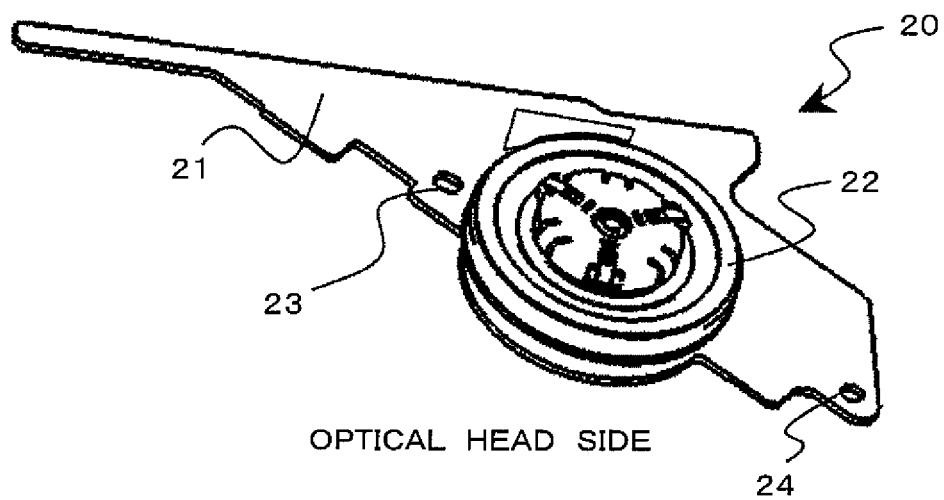
FIGS. 3A and 3B are views for explaining a spindle motor and an attachment plate of the conventional art.
Figure 3B:
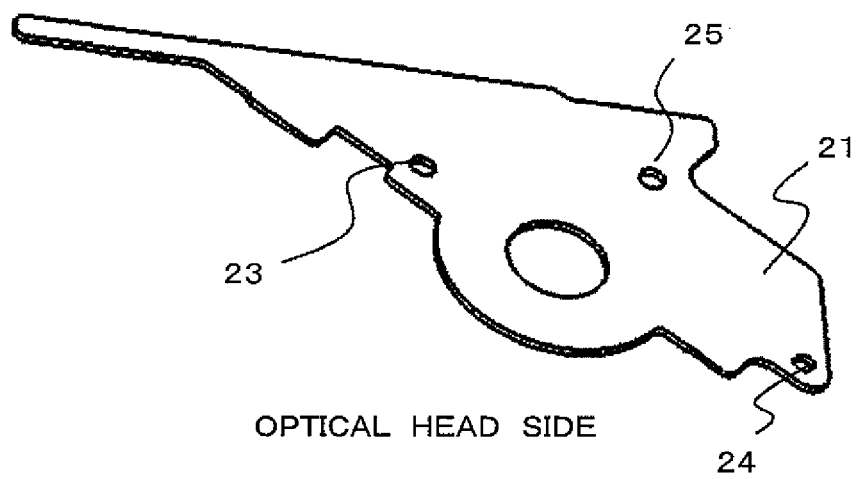

FIGS. 3A and 3B are views for showing the structures of the attachment plate 21 of the spindle motor 20, comparing to that of the spindle motor of the conventional art.

FIG. 3A is a view for showing an outlook of the spindle motor 20. The spindle motor 20 is constructed with a rotational driver means comprising a magnetic circuit, a rotor 22 and a rotation shaft, building up a rotation body, and the attachment plate 21 of the spindle motor 20 for supporting those thereon. That attachment plate 21 of the spindle motor 20 is made up with using the thin steel plate, and on that attachment plate 21 of the spindle motor 20 are fixed the rotor 22, as the rotation body, and the rotation shaft provided inside the rotor, etc. On a surface of the attachment plate 21 of the spindle motor 20, or a back surface thereof is stuck or pasted a circuit board, including electronic parts for rotating the spindle motor 20 therein, in general, though not shown in the figure.

FIG. 3B is a view for showing the attachment plate 21 of the spindle motor 20, deleting that rotor 22 therefrom. On that attachment plate 21 of the spindle motor 20 is formed a round opening at almost the center thereof, and on that round opening portion are fixed non-rotatable stationary portions of the rotor portion 22 (e.g., a part of magnetic driver circuit and a rotating shaft supporting means) with caking structures. Also, a part of the attachment plate 21 of the spindle motor 20 has a semi-circular plate portion, nearly same to the outer diameter of the rotor, on the side of the optical head 7, as shown in FIG. 2, so that the optical head 7 mentioned above does not contact or interfere with it if it is at the innermost peripheral position of the disc 2. And, the spindle motor 20 has three (3) pieces of small openings 23, 24 and 25 (i.e., a fixedly supporting portion A, a fixedly supporting portion B, and a fixedly supporting portion C), which are provided on the attachment plate 21 of the spindle motor 20, and it is fixed to the unit mechanism chassis 8 at the positions of those pats.

Figure 4A:
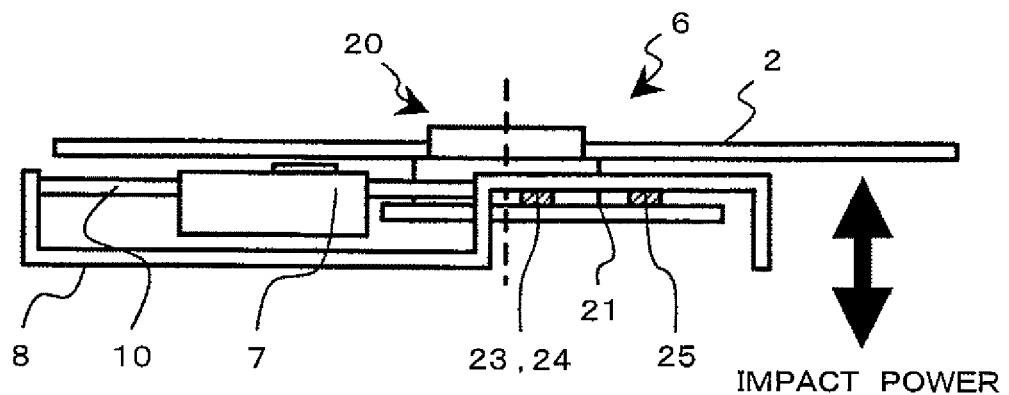
FIGS. 4A and 4B are views for explaining about a fall-down mode of the spindle motor, to be dissolved by the present invention.
Figure 4B:
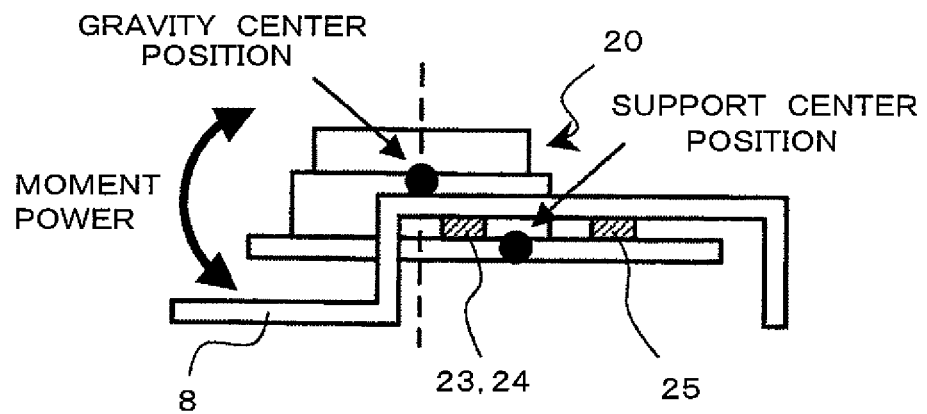

FIGS. 4A and 4B are views for explaining about behavior in the deformation of the spindle motor 20 when the impact or shock is applied thereon, to be dissolved by the present invention.

FIG. 4A shows the cross-section view along a line connecting between a central point of the spindle motor 20 and the optical head 7 on the unit mechanism 6, under the condition of loading the disc 2 thereon (i.e. the cross-section view cut along G-G line shown in FIG. 2), and FIG. 4B shows the cross-section view of the attachment plate 21 of the spindle motor 20. The direction of the impact or shock applied onto the disc drive apparatus 1 is in the vertical direction, as is shown by arrows in the figure, and the explanation will be made about the behavior of the unit mechanism 6, in this time, up to when it reaches to the deformation thereof.

The spindle motor 20 loading or mounting the disc 2 thereon is fixed to the unit mechanism chassis 8 at the fixedly supporting portion A 23, the fixedly supporting portion B 24 and the fixedly supporting portion C 25 of the attachment plate 21 of the spindle motor 20. The position of gravity center of the spindle motor 20 mounting the disc 2 thereon lies near to the vicinity of the rotor portion 22. With fixation of the spindle motor 20 at three (3) points, the center of support lies among the fixedly supporting portion A 23, the fixedly supporting portion B 24 and the fixedly supporting portion C 25, on the cross-section of the attachment plate 21 of that spindle motor 20, as is shown in the figure.

Thus, with respect to the position of the center gravity of the spindle motor 20, the supporting position is shifted to a completely biased or inclined position; i.e., the condition of support of open-sided (like, a cantilever). Accordingly, when the impact or shock is applied, then the spindle motor 20 generates a momental power at the position of the gravity center thereof, as is shown in the figure, with respect to the supporting position thereof. With this, deformation is generated in the attachment plate 21 of the spindle motor 20, and the rotor portion 22 is inclined; i.e., the disc 2 mounted thereon is also inclined, accompanying with this.

With this phenomenon, a relative inclination or tilting is produced between the optical head 7 and the disc 2, and this results to deterioration in performances as the disc drive apparatus 1, such as, the recording and the reproducing thereof. According to the present invention, the deformation of the attachment plate 21 of the spindle motor 20 is reduced when the impact or shock is applied thereon, and thereby providing the disc drive apparatus 1 having a high reliability with suppressing the deterioration in the recording/reproducing performances.

Figure 5A:
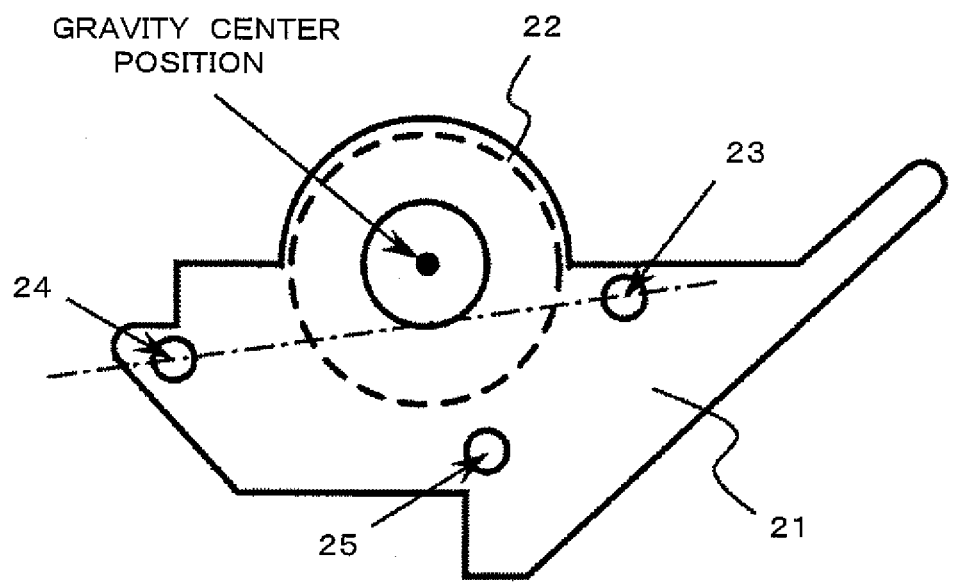
FIGS. 5A and 5B are views for showing distribution of bending stress, which is applied at the position where the spindle motor is attached (i.e., a fixedly supporting portion) and on an attachment plate.
Figure 5B:
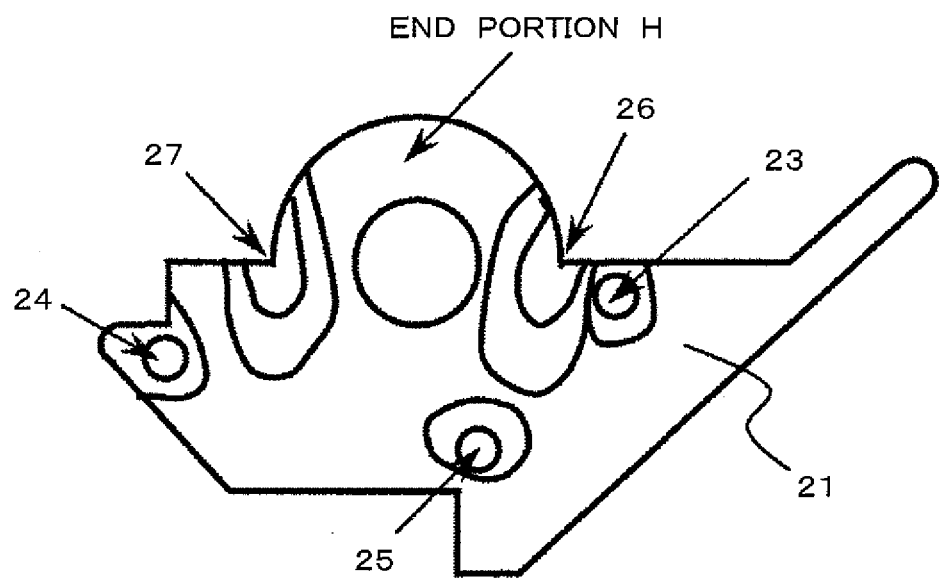

FIGS. 5A and 5B are views for showing the condition of distribution of bending stresses, which are generated on the attachment plate 21 of the spindle motor 20, depending on the fixedly supporting positions on the spindle motor 20 and the position of the gravity thereof, when the impact or shock is applied thereon.

FIG. 5A is an upper view of the attachment plate 21 of the spindle motor 20, wherein a mass body, i.e., the rotor portion 22 is depicted by a dotted line. Also, the fixing positions thereof onto the unit mechanism chassis 8 are the positions of the fixedly supporting portion A 23, the fixedly supporting portion B 24 and the fixedly supporting portion C 25. As was explained in the above, when the impact or shock is acted, then a force reacts, instantly, at the gravity center thereof, at which a center of the rotor portion 22 locates.

With this, bending stress is generated on the attachment plate 21 of the spindle motor 20, assuming the rotor portion 22 as a material point thereof. Since that spindle motor 20 is fixed at the fixedly supporting portion A 23, the fixedly supporting portion B 24 and the fixedly supporting portion C 25, therefore the attachment plate 21 of that spindle motor 20 is deformed, largely, in case when the flexural rigidity of the spindle motor 20 is low comparing to the flexural rigidity of the unit mechanism chassis 8. This deformation is generated in the vicinity of the line connecting between the fixedly supporting portion A 23 and the fixedly supporting portion B 24 shown in the figure.

FIG. 5B is a view for showing the distribution of the bending stresses generated on the attachment plate 21 of the spindle motor 20, when the impact or shock is applied, in the form of a contour map. In order to reduce the bending deformation, there is necessity of the structure for increasing the rigidity or dispersing the stress, at the places where the stresses are concentrating.

In the figure, it can be seen that the stresses concentrate on both corners of the semi-circular shaped portion fitting to the outer diameter of the rotor; i.e., a corner D and a corner E 27, and also the fixedly supporting portion A 23, the fixedly supporting portion B 24 and the fixedly supporting portion C 25. In the former, the end portion H of the semi-circular shaped portion of the attachment plate 21 of the spindle motor 20 is deformed, largely, and this results in the bending deformation of the attachment plate 21 of the spindle motor 20, which gives an ill influence upon the inclination or tilt of the rotor portion 22. In the latter, the stresses concentrate, locally, but give no ill influences upon the inclination or tilt of the rotor portion 22. The present invention relates to the structure for reducing and/or dispersing the stresses on the corner portion D 26 and the corner portion E 27.

Figure 6:
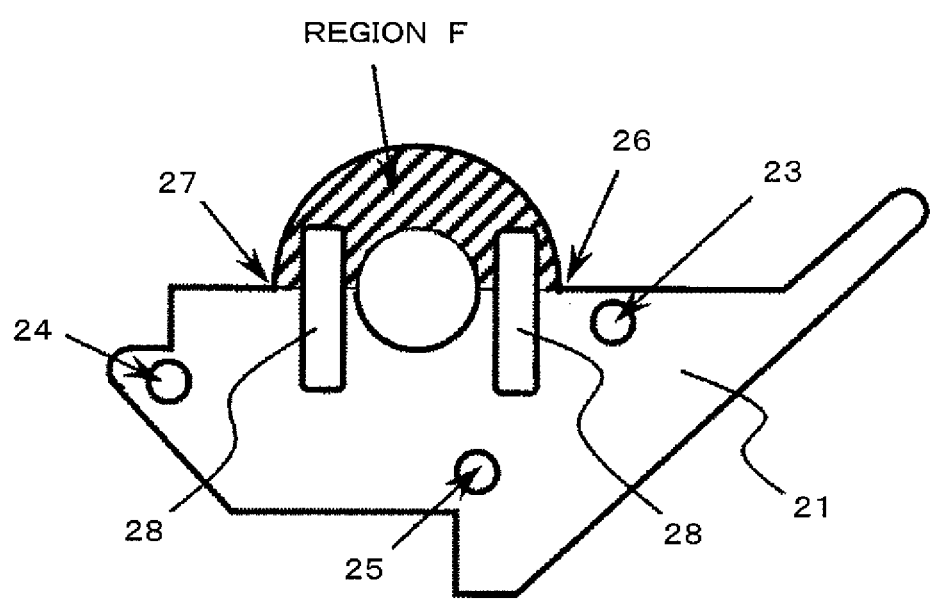
FIG. 6 is an explanatory view of an anti-bending reinforcement structure, which is provided on the attachment plate of the spindle motor, according to the present invention.

FIG. 6 is a view for explaining the structure of the attachment plate 21 of the spindle motor 20, according to the present invention, and in particular, for showing the structures for reducing and/or dispersing the stresses on the corner portion D 26 and the corner portion E 27 of the attachment plate 21 of the spindle motor 20 mentioned above.

In this FIG. 6, since the bending stresses concentrate on the corner portion D 26 and the corner portion E 27 of the attachment plate 21 of the spindle motor 20 when being applied with the impact or shock thereon, the bending deformations are generated on the attachment plate 21 of that spindle motor 20, largely, in the vicinity of the line connecting between those both corner portions 26 and 27. Herein, an area, which is surrounded by the lines connecting between the semi-circular shaped portion of the attachment plate 21 of the spindle motor 20 and that both corners 26 and 27, is called an area F. For the purpose of suppressing the bending deformation in this area, it is necessary to increase the flexural rigidity thereof, in the vicinity of a boundary region of this area, on the attachment plate 21 of the spindle motor 20, and as is shown in the figure, anti-bending reinforcement structures 28 are provided on both sides of the circular opening, which acts as the calking portion of the rotor portion 22, so as to bridge over those both boundary regions mentioned above.

With such structures, it is possible to reduce the bending stresses on the corner portions 26 and 27, as well as, to disperse them, and thereby enabling suppression of the bending deformation on the attachment plate 21 of the spindle motor 20. With this, the inclination or tilt of the of the disc 2 mounted on the spindle motor 20 can be suppressed even when the impact or shock is applied, and thereby reducing the relative inclination between the optical head 7 and the disc 2; i.e., it is possible to prevent the recording/reproducing performances from being deteriorated.

Figure 7A:
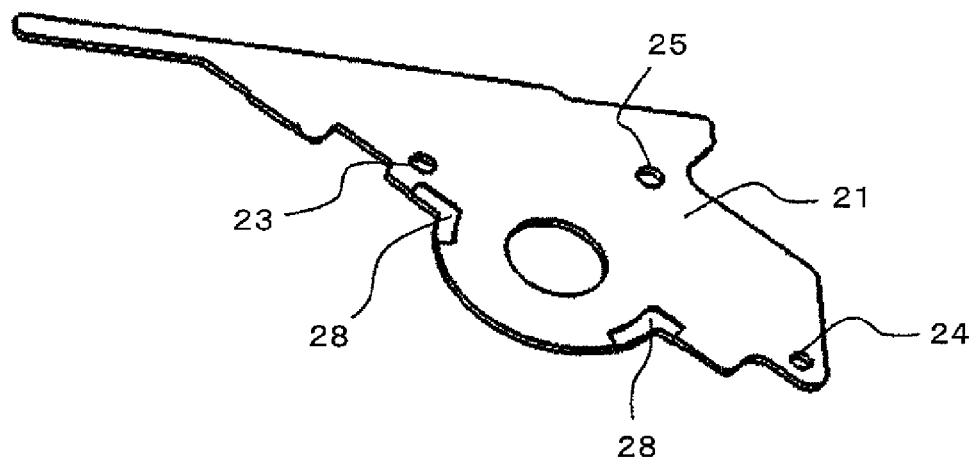
FIGS. 7A and 7B are views are perspective explanatory views of the anti-bending reinforcement structure, which is provided on the attachment plate of the spindle motor, according to the present invention.
Figure 7B:
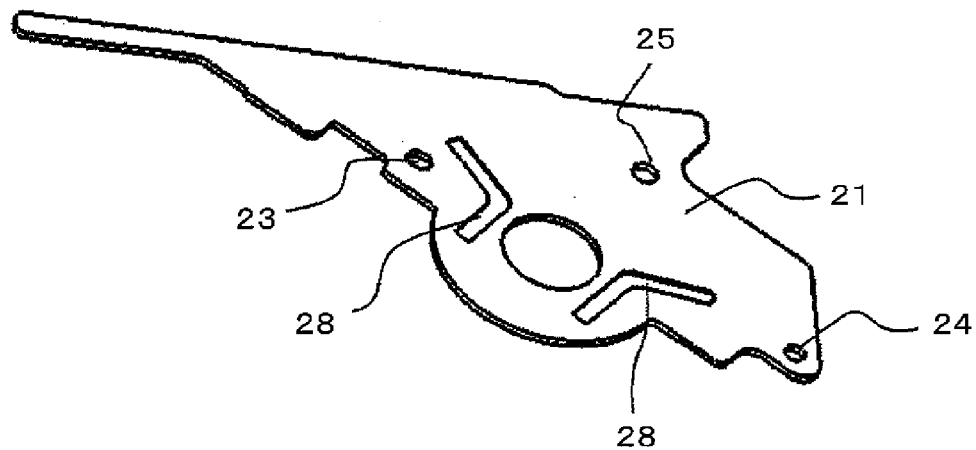

FIGS. 7A and 7B show an example of the anti-bending reinforcement structures 28, which are provide on the attachment plate 21 of the spindle motor 20, according to the present invention.

FIG. 7A shows the anti-bending reinforcement structures 28, which are provided on the corner portion D 26 and the corner portion E 27, on the attachment plate 21 of the spindle motor 20. The attachment plate 21 of the spindle motor 20 an article, which is produced through press working of the steel plate, and the anti-bending reinforcement structures 28 are formed on the both corner portions 26 and 27, in a step or stage-like structure of, such as, squeeze structure, half-pierce structure of bending structure at an end portion thereof, etc., for example.

FIG. 7B shows the anti-bending reinforcement structures 28, which are provided on the straight line connecting between the corner portion D 26 and the corner portion E 27, or regions bridging over the vicinity of the straight line connecting between the fixedly supporting portion A 23 and the fixedly supporting portion B 24. The anti-bending reinforcement structures 28 mentioned above are formed in the step-like structure of, such as, the squeeze structure through the press working, or the half-pierce structure. Both shown in FIGS. 7A and 7B have the anti-bending reinforcement structures 28 on both sides of the circular opening acting as the calking portion of the rotor portion; however, the present invention should not be restricted to this, but the anti-bending reinforcement structure may be provided on one side. Also, those anti-bending reinforcement structures 28 should not be in a single-body structure together with the attachment plate 21 of the spindle motor 20, but may be obtained by adhering separated members or the like.

As was fully mentioned in the above, according to the present invention, it is possible to reduce the plastic deformation of the attachment plate of the spindle motor, which is installed into the unit mechanism chassis, when the impact or shock is applied on the disc drive apparatus. Also, due to the reduction of amplitude in the deformation because of high rigidity of the attachment plate of the spindle motor, it can be protected from fatigue destruction thereof, if the stress acting repeatedly. Further, there can be provide parts having preferable characteristics because of high frequency of the natural mode, and with this, it is also possible to reduce the factors of disturbances onto servo-characteristic. With this, since it is possible to suppress the relative inclination or tilt between the disc mounted onto the spindle motor and the optical head, then it is possible to dissolve the problem of deteriorating the recording/reproducing performances, which are generated by the above-mentioned relative inclination or tilt. With the mentioned above, it is possible to provide the disc drive apparatus having high reliability.

The present invention may be embodied in other specific forms without departing from the spirit or essential feature or characteristics thereof. The present embodiment(s) is/are therefore to be considered in all respects as illustrative and not restrictive, the scope of the invention being indicated by the appended claims rather than by the forgoing description and range of equivalency of the claims are therefore to be embraces therein.

What is claimed is:

1. A disc drive apparatus, comprising:
a spindle motor, which is configured to hold and rotate a disc;
an optical head, which is configured to conduct either one of recording or reproducing of information onto/from the disc;
a driver unit, which is configured to move the optical head in a radial direction of the disc; and
a unit mechanism chassis, which is configured to support the spindle motor, the optical head and the driver unit thereon, fixedly, wherein
the spindle motor is constructed with a rotational drive means made of a magnetic circuit, a rotor portion and a rotation shaft, which define a rotation body, and a spindle motor attachment plate to hold the rotational drive means, the rotor portion and the rotation shaft thereon,
the spindle motor attachment plate has a semi-circular shaped plate portion in a part thereof, nearly fitting to an outer diameter the rotor portion, in a direction where the optical head is provided, and has a step-like structure in thickness direction of the plate thereof, and
the step-like structure is provided on the spindle motor attachment plate, and extends from the semi-circular shaped plate portion to a region which is an opposed portion to the semi-circular shaped plate portion in the spindle motor attachment plate so as to bridge over a line connecting between corner portions on both ends of the semi-circular shape plate portion.

2. The disc drive apparatus, as described in the claim 1, wherein
the step-like structure is provided in a region including the corner portions of the semi-circular shape plate portion.

3. The disc drive apparatus, as described in the claim 1, wherein
the spindle motor attachment plate is fixedly supported onto the unit mechanism chassis by fixedly supporting portions locating at least two positions, and the step-like structure extends further to the region which is the opposed portion to the semi-circular shaped plate portion in the spindle motor attachment plate so as to bridge over a line connecting between the two positions of the fixedly supporting portions, near to the optical head, in a radial direction of the disc, into which the optical head can move.

* * * * *